(12) United States Patent
Sung et al.

(10) Patent No.: US 12,263,624 B2
(45) Date of Patent: Apr. 1, 2025

(54) METALLIC NON-PAINTING INJECTION MOLDING FOR VEHICLES

(71) Applicants: HYUNDAI MOTOR COMPANY, Seoul (KR); KIA CORPORATION, Seoul (KR)

(72) Inventors: Han Ki Sung, Ulsan (KR); Min Jin Choi, Bucheon-si (KR); Young Rok Yoon, Ulsan (KR); Kyoung Sil Lee, Seoul (KR); JunSik Choi, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 147 days.

(21) Appl. No.: 17/371,769

(22) Filed: Jul. 9, 2021

(65) Prior Publication Data
US 2022/0219360 A1    Jul. 14, 2022

(30) Foreign Application Priority Data
Jan. 11, 2021    (KR) ........................ 10-2021-0003307

(51) Int. Cl.
| | | |
|---|---|---|
| B29C 45/14 | (2006.01) | |
| B29C 45/00 | (2006.01) | |
| B29C 45/27 | (2006.01) | |
| B29K 23/00 | (2006.01) | |
| B29K 105/00 | (2006.01) | |
| B29K 505/02 | (2006.01) | |
| B29L 31/30 | (2006.01) | |
| B60R 19/02 | (2006.01) | |

(52) U.S. Cl.
CPC .... B29C 45/14688 (2013.01); B29C 45/0001 (2013.01); B29C 45/14344 (2013.01); B29C 45/2708 (2013.01); B60R 19/02 (2013.01); B29C 2045/14713 (2013.01); B29K 2023/12 (2013.01); B29K 2105/0032 (2013.01); B29K 2505/02 (2013.01); B29K 2995/003 (2013.01); B29L 2031/3005 (2013.01)

(58) Field of Classification Search
CPC ............... B60R 19/02; B29K 2023/12; B29K 2105/0032; B29K 2505/02; B29K 2995/003; B29C 45/14688; B29C 45/0001; B29C 45/14344; B29C 45/2708; B29C 2045/14713; B29L 2031/3005
See application file for complete search history.

(56) References Cited

U.S. PATENT DOCUMENTS

| | | | |
|---|---|---|---|
| 2003/0134981 A1* | 7/2003 | Kim ........................ | C08L 23/10 525/191 |
| 2009/0239038 A1* | 9/2009 | Nagashima ......... | B29C 45/0025 428/156 |
| 2010/0043963 A1* | 2/2010 | Trummer ................ | B22F 9/082 420/528 |

(Continued)

Primary Examiner — Alicia J Weydemeyer
Assistant Examiner — Laura B Figg
(74) Attorney, Agent, or Firm — MORGAN, LEWIS & BOCKIUS LLP

(57) ABSTRACT

A metallic unpainted injection molding for a vehicle is disclosed. The metallic unpainted injection molding for a vehicle is molded by injecting metallic resins into a molding part inside an injection mold through a plurality of gates to be molded, wherein at least a groove line is molded in a boundary section where metallic resins meet each other in the molding part.

8 Claims, 4 Drawing Sheets

(56) References Cited

U.S. PATENT DOCUMENTS

| | | | |
|---|---|---|---|
| 2013/0065031 A1* | 3/2013 | Kasperchik | C09D 11/322 106/31.62 |
| 2015/0299360 A1* | 10/2015 | Murakami | B60R 13/02 525/205 |
| 2018/0133941 A1* | 5/2018 | Hur | B29C 33/48 |
| 2018/0194051 A1* | 7/2018 | Suzuki | B29C 45/0055 |
| 2019/0375927 A1* | 12/2019 | Imai | C08K 3/08 |

* cited by examiner

METALLIC NON-PAINTING INJECTION MOLDING FOR VEHICLES

CROSS-REFERENCE TO RELATED APPLICATION

The present application claims priority to Korean Patent Application No. 10-2021-0003307, filed on Jan. 11, 2021, the entire contents of which is incorporated herein for all purposes by this reference.

BACKGROUND OF THE INVENTION

Field of the Invention

The present invention relates to a metallic unpainted injection molding for a vehicle, and more particularly, to a metallic unpainted injection molding for a vehicle, capable of improving marketability by preventing a flake line occurring during injection molding from being exposed to an outside.

Description of Related Art

Recently, as the demand for eco-friendly non-painting materials is increasing, the demand for metallic materials that can realize a metallic texture appearance similar to that of metallic painting by itself without a painting process is increasing.

In particular, plastic materials for interior and exterior vehicles are increasingly using materials that have no gloss or low gloss for generating a luxurious feel.

Accordingly, for the application of non-painting materials, the development of a metallic material in which metal particles are applied to the material itself is continuously in progress.

However, after injection molding, an unpainted material requires additional mold changes due to appearance problems of a molded product caused by metal particles in the material, e.g., weld lines and flow patterns, or the application of the material itself is limited.

In the instant case, the flow pattern indicates a plurality of periodic stripes appearing on a surface of an injection-molded product in a direction crossing a flow direction, and is also referred to as a flow mark or a tiger mark.

This flow pattern is a phenomenon that appears according to fluctuation of a flow of a resin in the mold, and as a length of the flow increases, it appears as a defect in appearance of a flake line made of stripes near an end portion of the flow.

To solve the above problems, in the related art, researches such as on adjusting a shape and aspect ratio of metal particles or improving a surface coating material of metal particles are continuously being conducted, but there is a limit in ameliorating appearance problems such as pulling, agglomeration, and orientation of metal particles during injection molding by only improving the metal particles themselves.

Accordingly, there is a demand for research and development to prevent the flow pattern from deteriorating the appearance quality of the flow pattern during injection molding.

The information included in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present invention are directed to providing a metallic unpainted injection molding for a vehicle, configured for improving marketability by preventing a flake line occurring during injection molding from being exposed to an outside.

One or more embodiments of the present invention provide a metallic unpainted injection molding for a vehicle, molded by injecting metallic resins into a molding part inside an injection mold through a plurality of gates to be molded, wherein at least a groove line is molded in a boundary section where metallic resins meet each other in the molding part.

Furthermore, the metallic unpainted injection molding may have a penetration hole of a shape which is formed to extend along a width direction of the vehicle in a center portion, and may include a skid plate which is formed with the at least a groove line having a corresponding groove in a predetermined section starting from opposite corners of the penetration hole, respectively.

Furthermore, in the groove lines, a first groove line may be connected to a first lower side corner of the penetration hole based on a vehicle height direction, and is disposed to be inclined along an external surface of the skid plate corresponding to a first side corner, and a second groove line may be connected to a second lower side corner of the penetration hole based on the vehicle height direction, and is disposed to be inclined along the external surface of the skid plate corresponding to a second side corner.

The metallic resin may be supplied and injection-molded through the injection mold including a runner disposed at an inlet side of the injection mold to supply plasticized and melted metallic resin therethrough and a gate disposed between the runner and the molding part among the plurality of gates to introduce the plasticized and melted metallic resin supplied from the runner into the molding part.

Injection molding may be performed by use of the injection mold which is set in a temperature range of 50° C. or more than 50° C. and 60° C. or less than 60° C.

The metallic resin may be provided by mixing polypropylene (PP), a pigment, aluminum particles, rubber particles, and an additive in a predetermined amount, respectively.

The aluminum particles may have a circular disk shape, to express a metallic texture by specularly reflecting light.

The aluminum particles have a particle size which is set in a range of 16 μm or more than 16 μm and 40 μm or less than 40 μm.

The aluminum particles may be added in a range of 3% or more than 3% and 4% or less than 4% of a total content.

The metallic resin may be set in a temperature range of 210° C. or more than 210° C. and 230° C. or less than 230° C.

The metallic unpainted injection molding according to various exemplary embodiments of the present invention may improve marketability by preventing the flake line generated during injection molding from being exposed to the outside.

Furthermore, the metallic unpainted injection molding according to various exemplary embodiments of the present invention may have an effect of reducing cost by eliminating painting and plating processes, which are post-treatment processes on an external surface of a molding.

Furthermore, the metallic unpainted injection molding according to various exemplary embodiments of the present invention ameliorates coating film peeling through deletion of the painting process, reduces field claims, and reduces harmful substances generated during the painting process, improving the environment.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
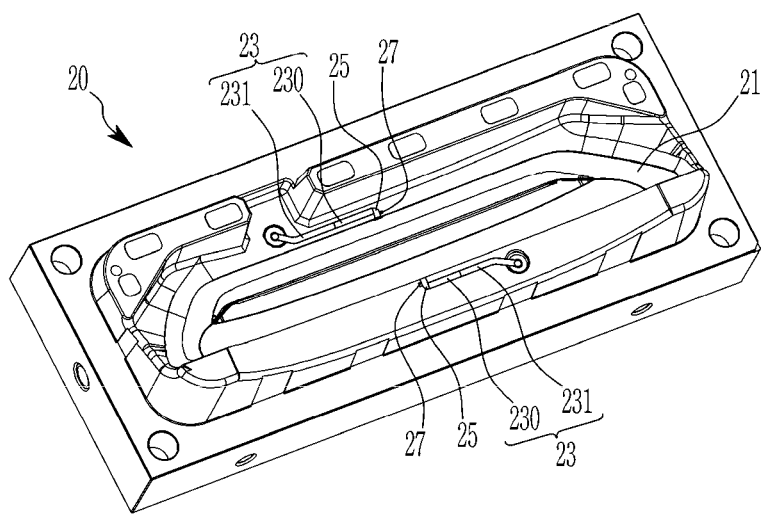
FIG. 1 illustrates a view for describing an injection mold for manufacturing a metallic unpainted injection molding for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various Exemplary embodiments of the present application will be described more fully with reference to the accompanying drawings, in which embodiments of the present invention are shown. As those skilled in the art would realize, the described embodiments may be modified in various different ways, all without departing from the spirit or scope of the present invention.

Parts that are irrelevant to the description will be omitted to clearly describe the present invention, and like reference numerals designate like elements throughout the specification.

FIG. 1 illustrates a view for describing a molding for determining a control amount of an electronic controlled suspension system according to various exemplary embodiments of the present invention.

Referring to FIG. 1, a metallic unpainted injection molding 1 (see FIG. 2) for a vehicle according to various exemplary embodiments of the present invention may be molded by injecting a metallic resin 30 (see FIG. 3) into an injection mold 20.

The injection mold 20 may include a runner 23, a gate 25, and a cold slug well 27.

The runner 23 may be disposed at an inlet side of the injection mold 20.

The runner 23 is configured to supply the metallic resin 30 which is plasticized and melted.

In the instant case, the runner 23 may include a hot runner 230 and a cold runner 231.

The hot runner 230 may be positioned at the entrance of the injection mold 20, and may have a predetermined temperature configured for maintaining a molten state of the flowing metallic resin 30.

The cold runner 231 is formed at a rear side of the hot runner 230 based on a traveling direction of the metallic resin 30.

The cold runner 231 is configured to transfer the metallic resin 30 supplied from the hot runner 230 to a molding part 21 in the injection mold 20.

The cold runner 231 may have a lower temperature than the hot runner 230.

The gate 25 is formed at a rear end portion of the cold runner 231 based on the traveling direction of the metallic resin 30.

The gate 25 is disposed between the cold runner 231 and the molding part 21 to introduce the metallic resin 30 supplied from the cold runner 231 into the molding part 21.

Furthermore, the cold slug well 27 is mounted at one side of the gate 25.

The cold slug well 27 may be configured to prevent the cured metallic resin 30 from flowing into the molding part 21.

An overall temperature of the injection mold 20 is set in a range of 50° C. or more than 50° C. and 60° C. or less than 60° C.

Meanwhile, the metallic resin 30 may be provided by mixing a thermoplastic compound 31, a pigment 33, aluminum particles 35, rubber particles 37, and an additive 39 in a predetermined amount, respectively.

In the instant case, the thermoplastic compound 31 may be, e.g., polypropylene (PP), or may be, e.g., polyamide (PA), polycarbonate (PC), polyethylene (PE), polyphenylene ether (PPE), polyether ether ketone (PEEK), polyphenylene sulfide (PPS), polymethyl methacrylate (PMMA), acrylonitrile butadiene styrene (ABS), polybutylene terephthalate (PBT), or a mixture of two or more thereof, in addition to polypropylene.

Furthermore, the pigment 33 is for eliminating a painting process, and adds a color which is actually exposed in appearance.

The aluminum particles 35 may have a circular disk shape, to apply a material configured for expressing a metallic texture by specularly reflecting light therefrom.

The aluminum particles 35 may have a particle size which is set in a range of 16 μm or more than 16 μm and 40 μm or less than 40 μm.

Furthermore, the aluminum particles 35 may be added in a range of 3% or more than 3% and 4% or less than 4% of a total content.

In addition to the aluminum particles 35, a material of the metal particles may be selected depending on metallic appearance required in the metallic unpainted injection molding 1.

A component of the metal particles may be any metal or an alloy of two or more metals, and specifically, may be aluminum or an aluminum-based alloy as described above, but the present invention is not limited thereto.

Furthermore, for the additive 39, one or more additives 39 commonly added to a composition of the metallic resin 30, e.g., at least one component selected from light diffusing agents, antioxidants, lubricants, ultraviolet absorbers, light stabilizers, impact modifiers, matting agents, flame retardants, or mixtures of two or more thereof, may be further included.

Furthermore, the metallic resin 30 may adjust a content of the additive 39 depending on a mixing amount of the aluminum particles 35 for a metallic texture.

The metallic resin 30 may be changed by controlling a mixing amount of a thermoplastic resin so that the metallic resin 30 not only performs a function of the portion, but also exhibits excellent metallic texture properties in an external element.

The metallic resin 30 may be set to a melting temperature in the range of 210° C. or more and 230° C. or less.

The metallic resin 30 as described above is eco-friendly because the painting process may be eliminated by applying a high-brightness metallic composite material.

Figure 2:
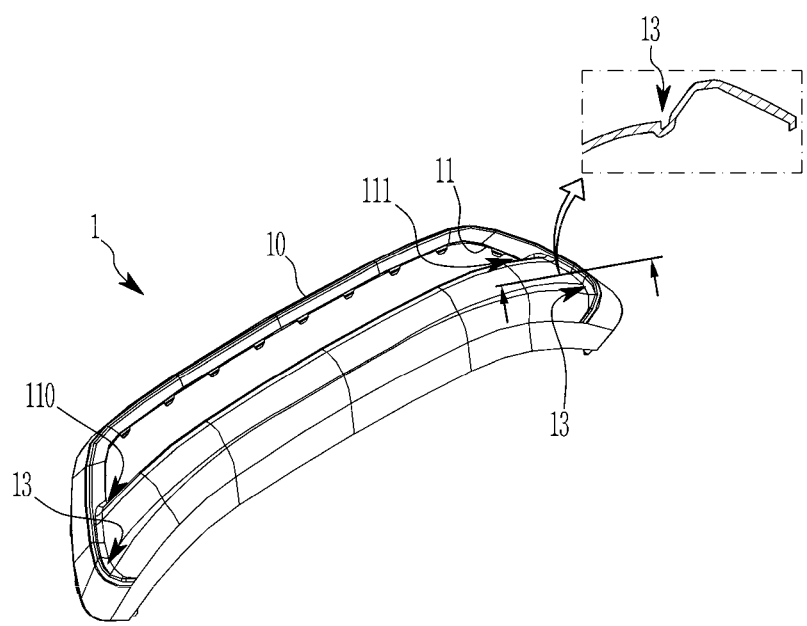
FIG. 2 illustrates a metallic unpainted injection molding for a vehicle according to various exemplary embodiments of the present invention.
Figure 3:
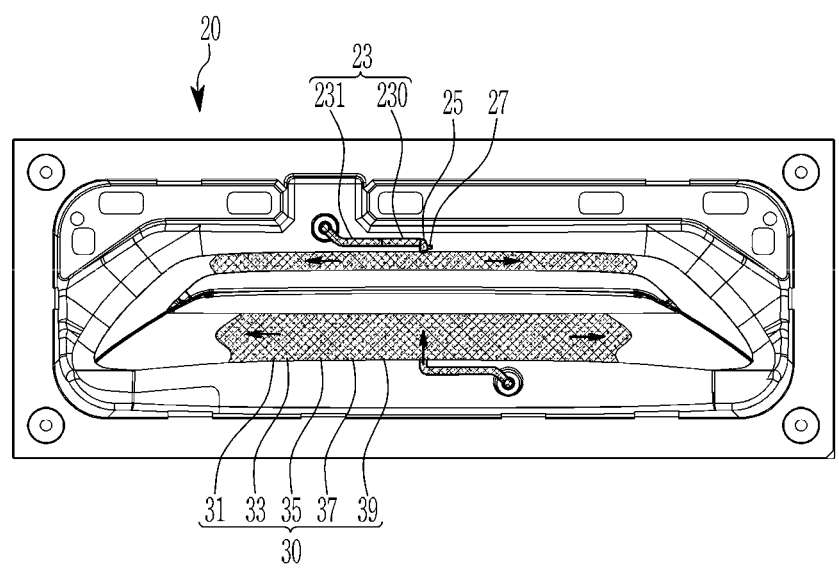
FIG. 3 and FIG. 4 illustrate views for describing a manufacturing method of a metallic unpainted injection molding for a vehicle according to various exemplary embodiments of the present invention.
Figure 4:
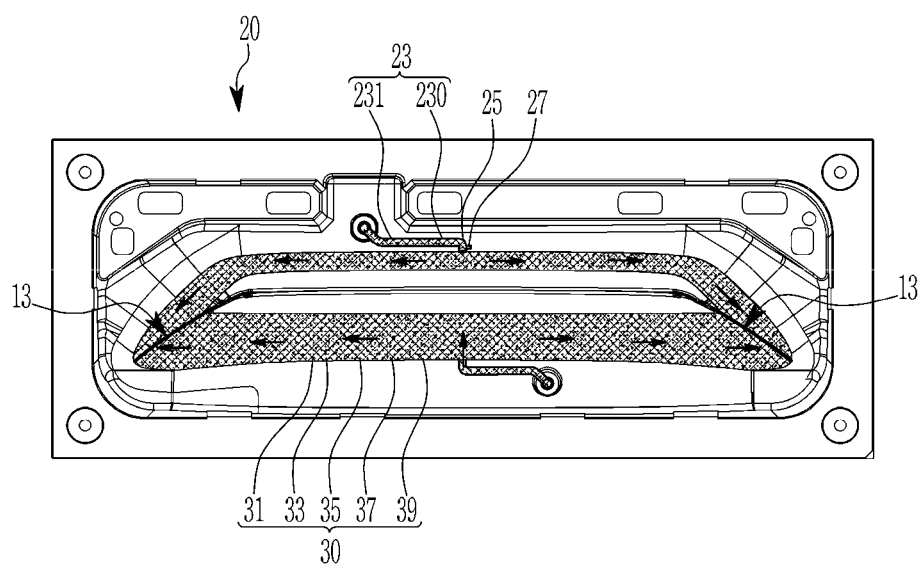

FIG. 2 illustrates a metallic unpainted injection molding for a vehicle according to various exemplary embodiments of the present invention, and FIG. 3 and FIG. 4 illustrate views for describing a manufacturing method of a metallic unpainted injection molding for a vehicle according to various exemplary embodiments of the present invention.

The metallic unpainted injection molding 1 for a vehicle according to various exemplary embodiments of the present invention may be manufactured by injecting the metallic resin 30 into the injection mold 20 as described above.

Referring to FIG. 2, for example, the metallic unpainted injection molding 1 may include a skid plate 10.

The skid plate 10 is a component disposed in the front of the vehicle, and a penetration hole 11 is formed to extend along a width direction of the vehicle.

The skid plate 10 is formed with groove lines 13 having grooves in a predetermined section starting from opposite corners 110 and 111 on the penetration hole 11, respectively.

That is, the groove lines 13 may be respectively formed at opposite sides of the skid plate 10 based on the width direction of the vehicle.

For example, the groove line 13 is connected to the first lower side corner of the penetration hole 11 based on a vehicle height direction, and is disposed to be inclined along an external surface of the skid plate 10 corresponding to the first side corner 110.

For example, the groove line 13 is connected to the second lower side corner of the penetration hole 11 based on the vehicle height direction, and is disposed to be inclined along an external surface of the skid plate 10 corresponding to the second side corner 111.

Referring to FIG. 3 and FIG. 4, the groove lines 13 are formed at positions in the injection mold 20, where metallic resins 30 injected through the gates 25 configured at opposite sides of the skid plate 10 respectively meet each other with respect to the vehicle height direction.

Although the metallic unpainted injection molding 1 according to various exemplary embodiments of the present invention has been described using the skid plate 10 as an example, it is not necessarily limited thereto, and it may include a bumper molding, interior and exterior garnishes, exterior mirror scalps, various fillers, etc.

Accordingly, the metallic unpainted injection molding 1 according to various exemplary embodiments of the present invention may improve scratch resistance, stain resistance, and impact resistance by applying a high-brightness metallic composite material.

Furthermore, the metallic unpainted injection molding 1 according to various exemplary embodiments of the present invention may reduce cost by eliminating painting and plating processes, which are post-treatment processes, on an external surface of a molding.

The metallic unpainted injection molding 1 according to various exemplary embodiments of the present invention may improve marketability by preventing the flake line generated during injection molding from being exposed to the outside.

That is, the metallic unpainted injection molding 1 may improve appearance quality by including a weld line or a flow mark in the groove lines 13.

For the present reason, the metallic unpainted injection molding 1 may increase freedom of design, improve moldability, and secure productivity.

Furthermore, the metallic unpainted injection molding 1 according to various exemplary embodiments of the present invention ameliorates coating film peeling through deletion of the painting process, reduces field claims, and reduces harmful substances generated during the painting process, improving the environment.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A metallic unpainted injection molding for a vehicle, wherein the metallic unpainted injection molding is molded by injecting a metallic resin into a molding part inside an injection mold through a plurality of gates to be molded, wherein at least a groove line is molded in a boundary section where metallic resins meet each other in the molding part,
wherein the metallic unpainted injection molding includes a penetration hole of a shape which is formed to extend along a vehicle width direction in a center portion thereof, and includes a skid plate which is formed with the at least a groove line including a corresponding groove in a predetermined section starting from opposite corners of the penetration hole, respectively,
wherein the at least a groove line is respectively formed at opposite sides of the skid plate based on the vehicle width direction, wherein the at least a groove line includes a first groove line and a second groove line, wherein the first groove line is connected to a first lower side corner of the penetration hole based on a vehicle height direction, and is disposed to be inclined along an external surface of the skid plate corresponding to a first side corner of the penetration hole, and wherein the second groove line is connected to a second lower side corner of the penetration hole based on the vehicle height direction, and is disposed to be inclined along the external surface of the skid plate corresponding to a second side corner of the penetration hole, wherein at least a flake line occur in a boundary section where metallic resins from different gates among the plurality of gates meet each other in the molding part, and wherein at least a groove line is molded in the boundary section to prevent the at least a flake line being exposed to an outside.

2. The metallic unpainted injection molding of claim 1, wherein the metallic resin is supplied and injection-molded through the injection mold including a runner disposed at an inlet side of the injection mold to supply plasticized and melted metallic resin therethrough and a gate disposed between the runner and the molding part among the plurality of gates to introduce the plasticized and melted metallic resin supplied from the runner into the molding part.

3. The metallic unpainted injection molding of claim 2, wherein injection molding is performed by use of the injection mold which is set in a temperature range of 50° C. to 60° C.

4. The metallic unpainted injection molding of claim 1, wherein the metallic resin is prepared by mixing polypropylene (PP), a pigment, aluminum particles, rubber particles, and an additive in a predetermined amount, respectively.

5. The metallic unpainted injection molding of claim 4, wherein the aluminum particles have a circular disk shape, to express a metallic texture by specularly reflecting light.

6. The metallic unpainted injection molding of claim 4, wherein the aluminum particles have a particle size which is set in a range of 16 μm to 40 μm.

7. The metallic unpainted injection molding of claim 4, wherein the aluminum particles are added in a range of 3% to 4%" of a total content.

8. The metallic unpainted injection molding of claim 1, wherein the metallic resin is set in a temperature range of 210° C. to 230° C.

\* \* \* \* \*